United States Patent
Sadler

[19]

[11] Patent Number: 6,058,319
[45] Date of Patent: May 2, 2000

[54] CASSETTE ADAPTER FOR MOBILE TELEPHONES

[75] Inventor: John Thomas Sadler, Raleigh, N.C.

[73] Assignee: Ericsson, Inc., Research Triangle Park, N.C.

[21] Appl. No.: 08/811,592

[22] Filed: Mar. 5, 1997

[51] Int. Cl.[7] .................................................. H04Q 7/32
[52] U.S. Cl. .......................................... 455/569; 455/557
[58] Field of Search .................................. 455/569, 149, 455/556, 557; 369/1, 2

[56] References Cited

U.S. PATENT DOCUMENTS

| | | |
|---|---|---|
| 3,978,524 | 8/1976 | Gordon et al. . |
| 3,991,369 | 11/1976 | Fujimoto . |
| 4,378,603 | 3/1983 | Eastmond . |
| 4,734,897 | 3/1988 | Schotz . |
| 5,161,131 | 11/1992 | Borchardt et al. ............................ 369/1 |
| 5,307,326 | 4/1994 | Osawa ........................................ 369/2 |
| 5,444,675 | 8/1995 | De Bie et al. . |
| 5,487,182 | 1/1996 | Hansson . |
| 5,588,041 | 12/1996 | Meyer, Jr. et al. . |
| 5,590,414 | 12/1996 | Marui et al. .............................. 455/569 |
| 5,590,417 | 12/1996 | Rydbeck . |
| 5,781,850 | 7/1998 | Ugge' et al. .............................. 455/149 |
| 5,867,794 | 2/1999 | Hayes et al. .............................. 455/569 |

FOREIGN PATENT DOCUMENTS

| | | |
|---|---|---|
| 2 590 397 | 11/1985 | France . |
| 2264613 | 9/1993 | United Kingdom . |
| WO 94/24774 | 10/1994 | WIPO ..................................... 455/149 |
| WO 95/20271 | 7/1995 | WIPO . |

*Primary Examiner*—Dwayne D. Bost
*Assistant Examiner*—Myron K. Wyche
*Attorney, Agent, or Firm*—Coats & Bennett, P.L.L.C.

[57] ABSTRACT

A mobile radio telephone system includes a hands free kit which allows the audio signal to be output through a car stereo system. The mobile radio telephone system includes a hand held unit, a cassette adapter, and a coupling unit. The hand held unit is a fully functional mobile telephone including a receiver and transmitter capable of transmitting and receiving voice and/or data signals. The cassette adapter is configured to load into a cassette player of a car stereo system. The cassette adapter includes a record head for contacting a play-back head in the cassette player when the cassette adapter is loaded into the cassette player. A coupling unit attached to the hand held unit and includes a coupling circuit for electrical connecting the cassette adapter to the hand held unit. When the cassette adapter is coupled to the hand held unit, audio signals are output from hand held unit to the cassette adapter and picked up by the cassette player.

14 Claims, 8 Drawing Sheets

CASSETTE ADAPTER FOR MOBILE TELEPHONES

FIELD OF THE INVENTION

The present invention relates generally to hands-free kits for mobile telephones and more particularly, to a cassette adapter for a mobile telephone to enable voice signals to be output via a car stereo system.

BACKGROUND OF THE INVENTION

One of the most common accessories for a mobile telephone is a hands-free kit which enables hands-free use of the mobile telephone while a vehicle is being driven. Generally speaking, a hands-free kit includes a speaker, microphone and amplifier which are external to the mobile telephone. The hands-free kit might also include a physical entrapment, such as a cradle, to receive and hold a mobile telephone while the car is being driven. The cradle provides an electrical connection to the mobile phone when the phone is nested in the cradle. The external speaker and microphone are connected directly or indirectly to the cradle. When the driver leaves the vehicle, the mobile telephone can be removed from the cradle and carried.

One problem with prior art designs for hands-free kits is that they require a separate speaker and power amplifier. These components are already part of a car stereo system which is present in the vast majority of vehicles manufactured today. Thus, the current designs duplicate components which are already present.

Another drawback with prior art designs is that there is no easy way to control the volume of the speakers. In current designs, volume control circuitry is included in the mobile telephone. Access to the volume control functions is provided by the touch pad and display on the mobile phone. The user can change the volume by pushing buttons and scrolling through menus on the display. This method of volume control requires a great deal of attention (which defeats the purpose of a hands-free kit). Further, there is no easy way to adjust the volume during a call.

SUMMARY OF THE INVENTION

The present invention solves the aforementioned and other problems of the prior art by providing a cassette adapter that allows audio signals to be output via a car stereo system. The cassette adapter takes the form of a conventional cassette and an associated electrical adapter which plugs into a cradle or phone adapter to provide an electrical connection with the mobile phone. The cassette adapter includes an audio circuit having an output head which contacts the play-back head in a cassette player. When audio signals are supplied to the cassette adapter, the output head applies the audio signals to the play-back head of the cassette player. The audio signals applied to the play-back head in this manner are processed in the same manner as if they had been reproduced or picked-up from a cassette tape.

The present invention eliminates the need to provide a separate amplifier and speaker as part of the hands-free kit since these components are already part of the car stereo system. Further, the car stereo system includes a volume control which is far more convenient to use than a volume control typically associated with a mobile radio telephone hands-free kit.

In certain embodiments of the invention, the present invention also has the advantage of being portable. That is, in certain embodiments, the hands-free kit can be readily moved from one vehicle to another. Thus, the hands-free kit of the present invention could be used, for example, in a rental car which is not otherwise provided with a mobile telephone.

Other objects and advantages of the present invention will become apparent and obvious from a study of the following description and the accompanying drawings which are merely illustrative of such invention.

DETAILED DESCRIPTION OF THE INVENTION

Figure 1:
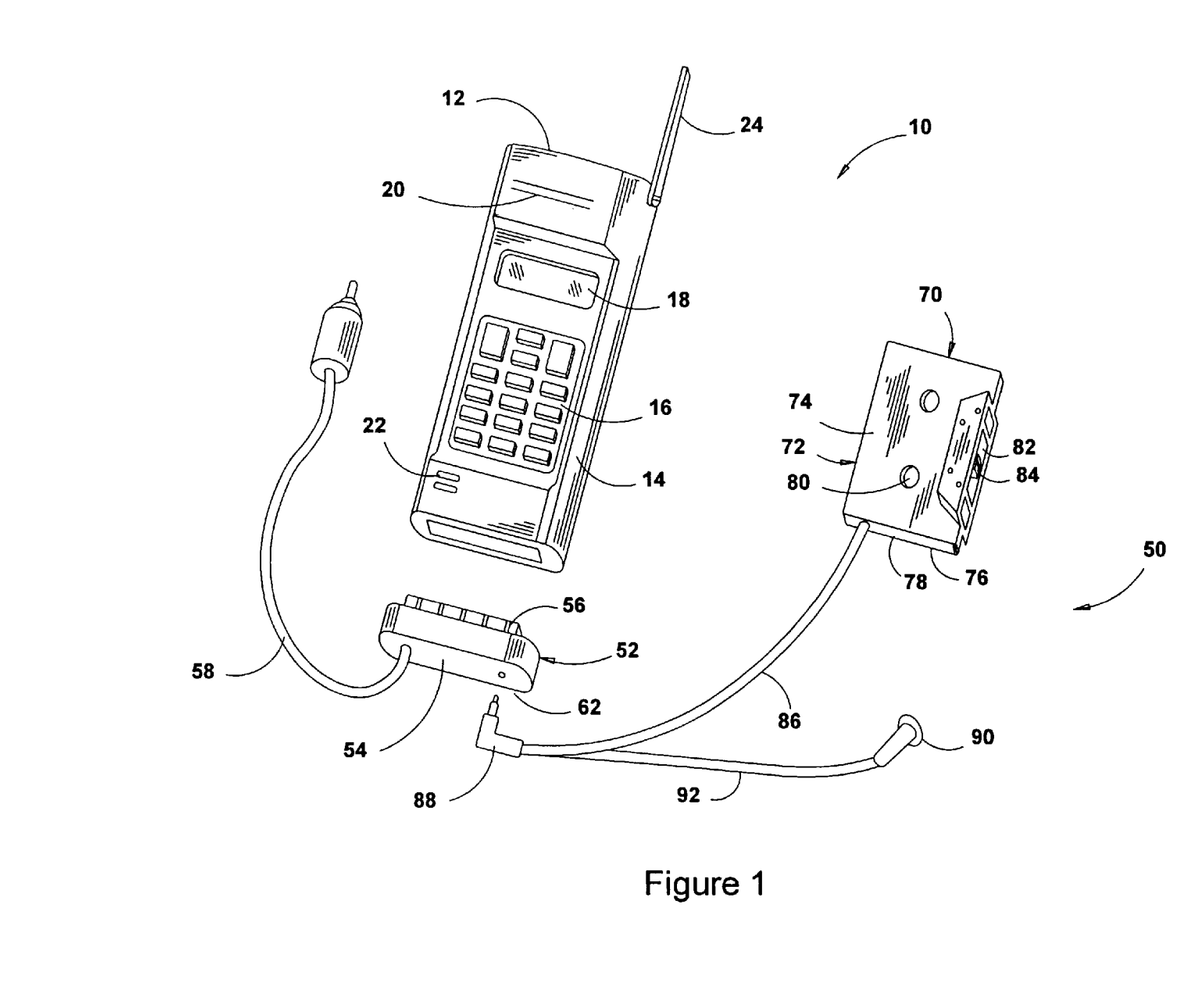
FIG. 1 is a perspective view of a first embodiment of the hands-free kit.

Referring now to the drawings, the mobile phone system of the present invention is shown therein and indicated generally by the numeral 10. The mobile phone system 10 of the present invention comprises a hand-held mobile unit 12 and a hands-free kit 50. The mobile unit 12 is a fully functional, battery-powered, mobile transceiver capable of sending and receiving voice and/or data signals. The hands-free kit 50 is an accessory that allows the mobile unit 12 to be used in a hands-free mode in a vehicle. The hands-free kit 50 includes a coupling unit 52, a cassette adapter 70, and an external microphone 90.

The mobile unit 12 includes a housing 14 which contains a key pad 16, display 18, speaker 20, microphone 22, and antenna 24. The housing 12 also includes a battery connection (not shown) for an external battery pack. A printed circuit board is contained within the housing 14 which includes the signal processing and control circuits which control the operation of the mobile unit 12.

Figure 2:
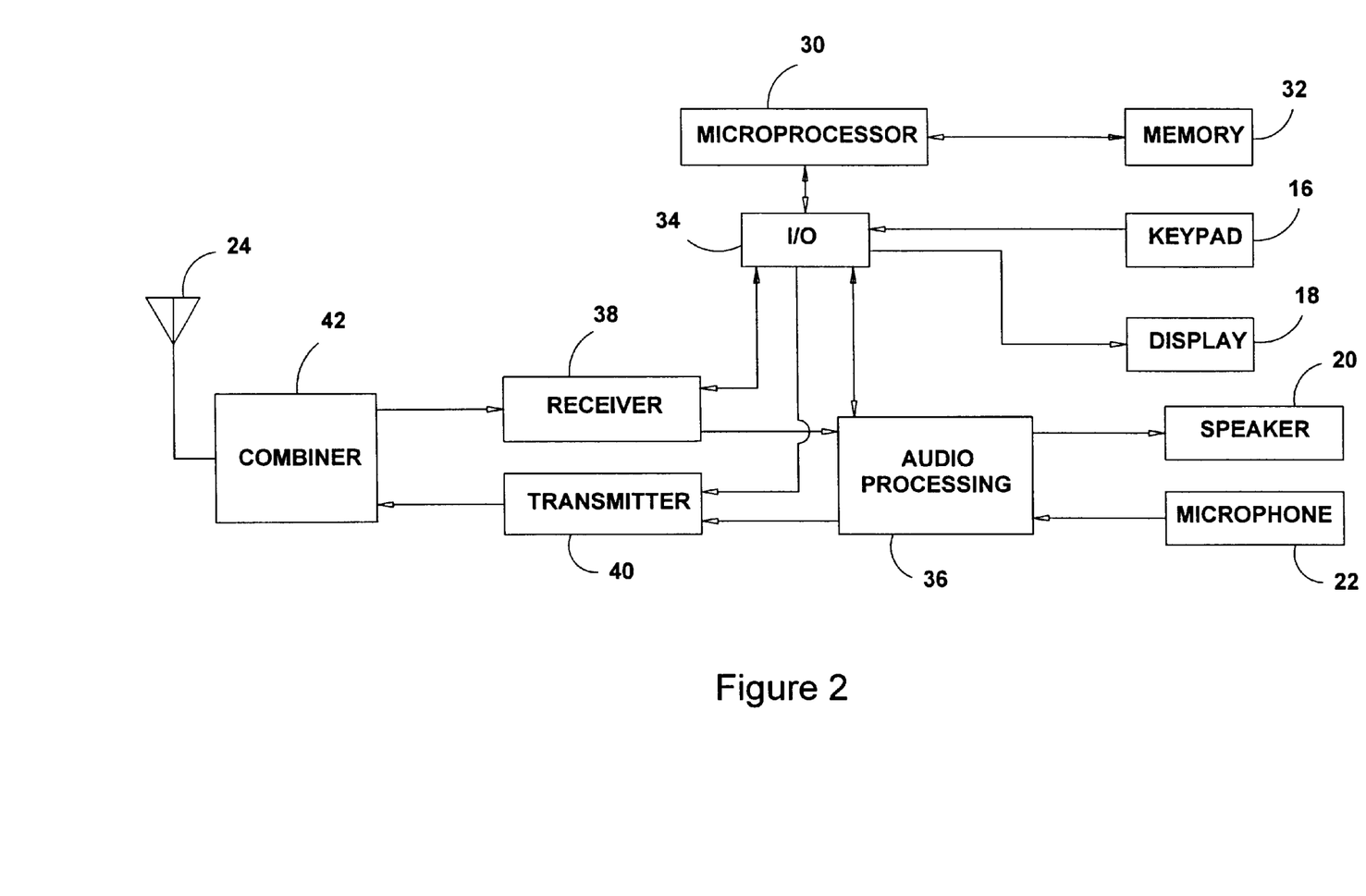
FIG. 2 is a schematic block diagram of the mobile unit.

FIG. 2 shows in block diagram form the general architecture of the mobile unit 12. The mobile unit 12 includes a microprocessor 30 for controlling the operation of the mobile unit 12 and a program memory 32 for storing programs used by the mobile unit 12. Input/output circuits 34 interface the microprocessor 30 with the key pad 16, display 18, audio processing circuits 36, receiver 38, and transmitter 40. The audio processing circuits 36 provide basic analog audio outputs to the speaker 20 and accept analog audio inputs from the microphone 22. A signal combiner 42 permits, full duplex communication over the antenna 24.

As previously mentioned, the hands-free kit 50 includes a coupling unit 52, cassette adapter 70, and external microphone 90. The coupling unit 52 includes a housing 54 having a connector 56 for connecting the coupling unit 52 to the mobile phone 12. The connector 56 mates with a connector 28 on the mobile unit 12. The connector 56 and connector 28 each include a series of contacts to electrically connect the coupling unit 52 with the mobile unit 12. The connectors 56 and 28 also provide a mechanical connection between the coupling unit 52 and mobile unit 12.

The housing 54 contains a coupling circuit 60 which electrically connects the cassette adapter 70 and external microphone 90 to the mobile unit 12. The coupling circuit 60 includes a jack 62 which is used to couple the cassette adapter 70 and microphone 90 to the coupling unit 52. The coupling circuit 60 will be described in greater detail below.

In a preferred embodiment of the invention, the coupling unit 52 includes a power cord 58 which connects the coupling unit 52 to a power source. In FIG. 1, the power cord 58 is shown as a cigarette lighter adapter cable that plugs into a conventional cigarette lighter in a vehicle. Other forms of adapter cables could also be used to supply a power to the coupling unit 52. For example, the power cord 58 could include a transformer which plugs into a conventional A/C outlet. This would allow use of the mobile phone system 10 as a fixed station in a remote location where land line communications are not otherwise available.

The cassette adapter 70 comprises a cassette case 72 having a top wall 74, a bottom wall 76, and a peripheral wall 78 joining the top and bottom walls 74 and 76. The cassette case 72 is configured like a conventional reel-to-reel cassette so that it can be inserted into a conventional cassette player. The cassette case 72 includes a pair of openings 80 which extend through the top and bottom walls 74 and 76. The openings 80 are positioned to receive the drive spindles of a conventional cassette player when the adapter 70 is inserted into the cassette player.

A side opening 82 is provided in the peripheral wall 76 along one of the long sides of the cassette case 72. A record head 84 is supported in the cassette case 72 and positioned adjacent the side opening 82 so that the record head 84 contacts the play-back head in the cassette player. The record head 84 applies audio signals to the play-back head of the cassette player. The transferred signals are then processed by the cassette player in the usual manner as if they had been "picked-up" from a cassette tape.

An electrical cord 94 is connected at one end to the cassette adapter 70 and includes a plug or jack 96 at the opposite end. The plug 96 may, for example, comprise a conventional stereophonic plug which is readily commercially available from various manufacturers. Plug 96 is adapted to be received in jack 62 on the coupling unit 52. The cord 94 carries the audio signals output from the mobile unit 12 to the the cassette adapter 70 which, in turn, applies the signal to the play-back head of the cassette recorder. Thus, it will be readily apparent to those skilled in the art that the cassette adapter 70 allows the mobile unit to output audio signals via a car stereo system. This approach avoids the need for separate power amplifier and speakers as part of the hands-free kit 50 since the present invention uses the amplifier and speakers already present in a conventional car stereo system.

The microphone 90 is connected by a cord 92 to the plug 88. When the plug 88 is inserted into the jack 62 of the coupling unit 52, the microphone 90 is coupled to the mobile unit 12. Thus, audio signals picked-up by the microphone 90 are passed through the coupling unit 52 to the mobile unit 12.

Figure 3:
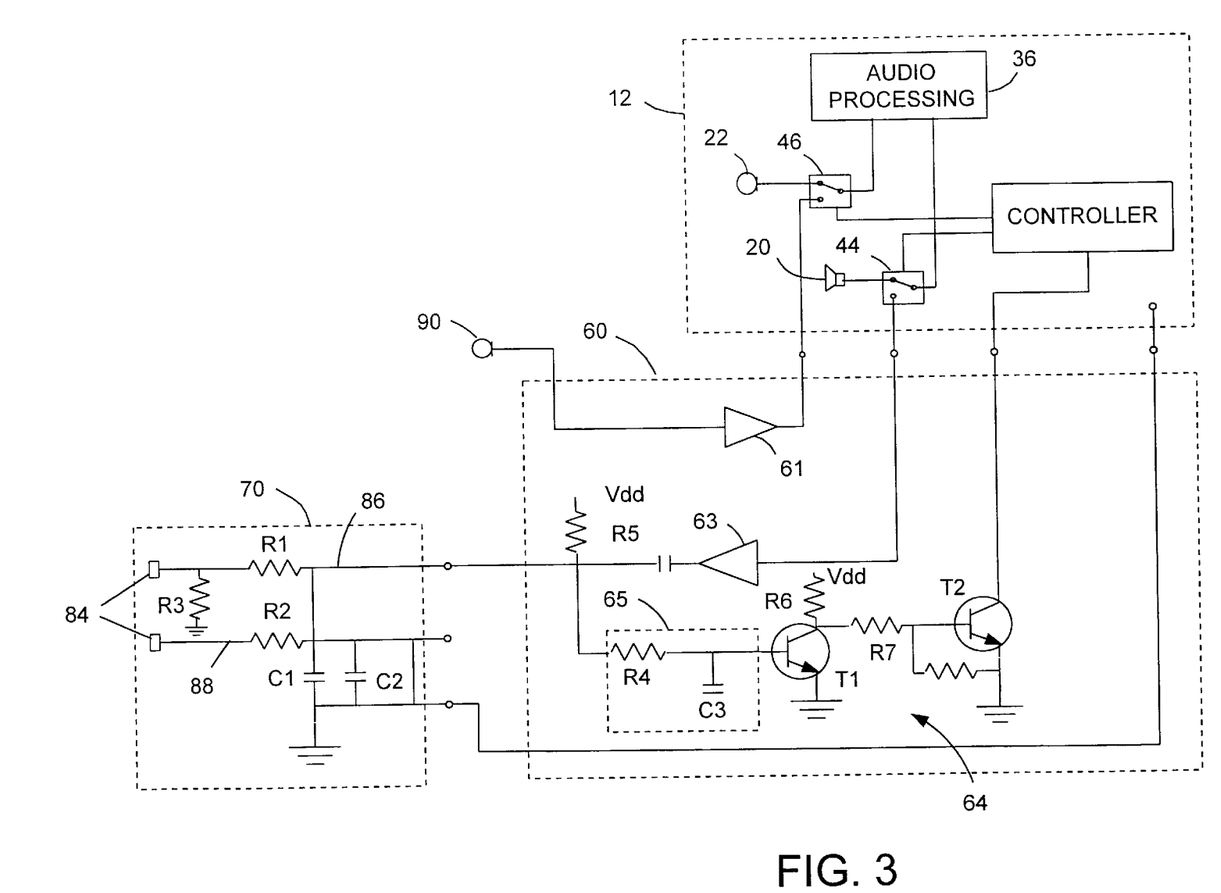
FIG. 3 is a schematic diagram of the coupling unit, mobile unit, and cassette adapter.

FIG. 3 shows a circuit diagram showing the mobile unit 12, coupling unit 52, cassette adapter 70 and external microphone 90. As previously described, the mobile unit 12 includes an audio processing circuit 36 which provides basic analog audio outputs to the speaker 20 and excepts analog audio inputs from the microphone 22. The audio output signal from the audio processing circuit 36 is directed by switch 44 to either the internal speaker 20 in the mobile unit 12 or to the coupling unit 52 via connector 28. In a similar manner, switch 46 selects the source of the audio input signals to the audio processing circuit 36. Switch 46 selects between the internal microphone 22 in the mobile unit 12 and the external microphone 90 attached to the coupling unit 52.

The coupling circuit 60 electrically connects the cassette adapter 70 and external microphone 90 to the mobile unit 12. The coupling circuit 60 includes an input amplifier 61 to amplify the input from the external microphone 90, an output amplifier 63 to amplify the output from the mobile unit 12, and a detection circuit 64 to detect when the cassette adapter 70 is connected to the coupling circuit 52. The detection circuit 64 will be described in greater detail below.

The cassette adapter 70 includes two separate wires 86 and 88 representing two separate input channels to the record head 84. Wires 86 and 88 are connected to a common ground via capacitors C1 and C2, and to respective terminals of the record head 84 via resistors R1 and R2. Resistor R1 and capacitor C1 function as a frequency response compensation circuit for the left channel while the resistor R2 and capacitor C2 function as a frequency response compensation circuit for the right channel. It is contemplated that the present invention will use only a single channel. Therefore, electrical wire 88 which represents the right channel is connected directly to the ground. A small pull-down resistor R3 is connected to the electrical wire 86. The function of the pull-down resistor R3 will be explained below.

Referring now to the detection circuit 64, it includes a low-pass filter 65 and a pair of transistors T1 and T2. The low-pass filter 65 comprises resistor R4 and capacitor C3. The input of the low-pass filter is connected via resistor R5 to a reference voltage $V_{dd}$. The output of the low-pass filter 65 is connected to base of transistor T1. The collector of transistor T1 is connected via resistor R6 to the reference voltage $V_{dd}$. The emitter side of the transistor T1 is connected to ground.

The base of transistor T2 is connected through resistor R7 to the collector side of transistor T1. The emitter of transistor T2 is connected to ground. The collector side of transistor T2 is connected to the controller in the mobile unit 12 via connector 56.

When the cassette adapter 70 is disconnected, the reference voltage $V_{dd}$ is applied at the input of the low-pass filter 65 which charges capacitor C3. Consequently, relatively high voltage will be applied to the base of transistor T1 thereby activating the transistor T1. When transistor T1 is active, current will flow across resistor R6 to ground via transistor T1 so that the voltage at the base of transistor T2 will be zero. Consequently, transistor T2 will be inactive. When transistor T2 is not active, the controller is disconnected from ground and switches the output and input to the internal speaker 20 and microphone 22 respectively.

When the cassette adapter 70 is attached to the coupling unit 52, the reference voltage $V_{dd}$ is dropped across resistor R3 in the cassette adapter 70. Thus, a relativity low voltage will be applied to the base of transistor T1. Consequently, current will flow across resistor R6 to the base of transistor T2. When transistor T2 is active, the controller is connected to ground indicating that the cassette adapter is attached. The controller in the mobile unit 12 will therefore direct the audio output to the cassette adapter 70 and will select the external microphone 90 as the source for the audio input.

Figure 4:
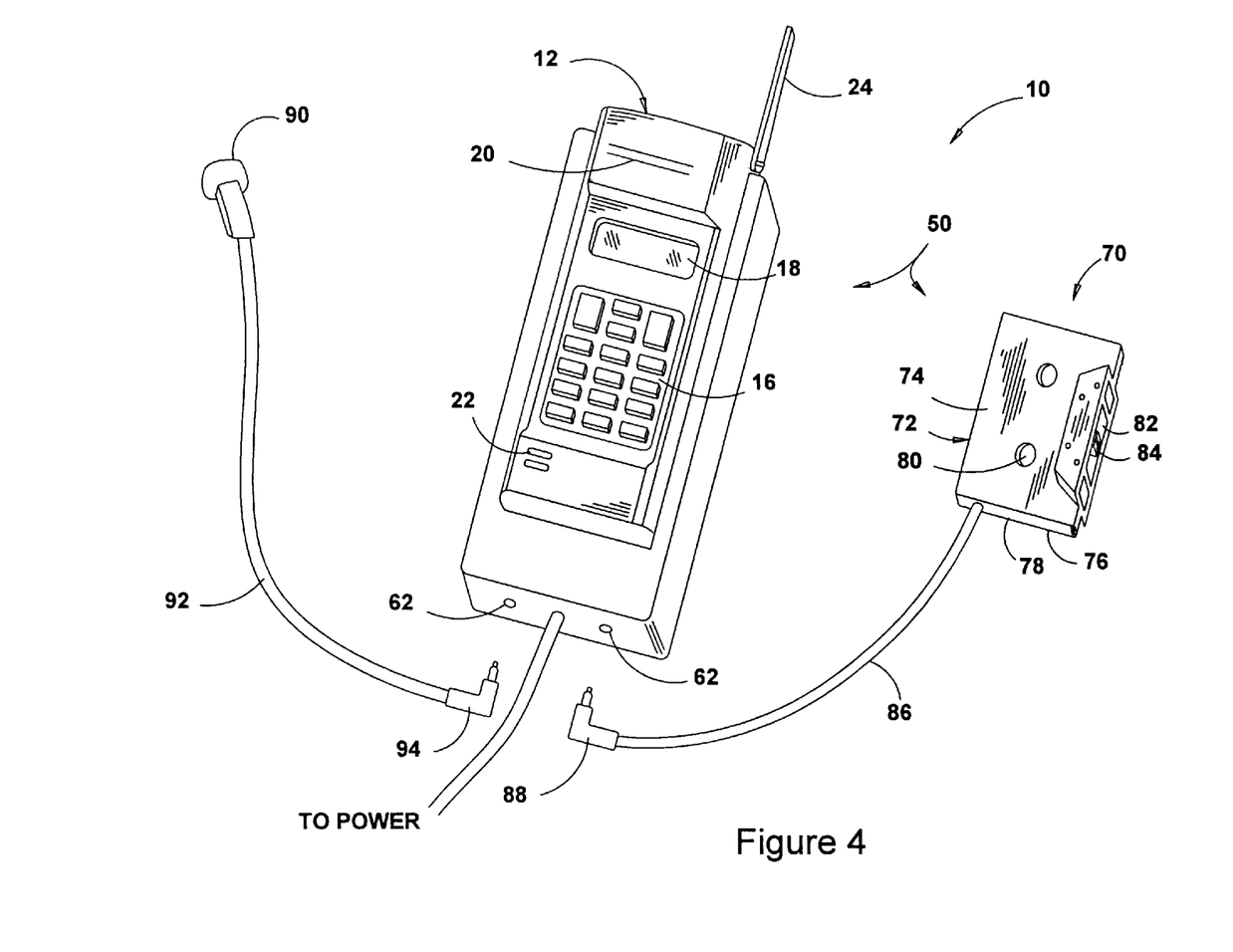
FIG. 4 is a perspective view showing a second embodiment of the hands-free kit of the present invention.

Referring now to FIG. 4, a second embodiment of the present invention is shown. The embodiment shown in FIG. 4 is similar to the first embodiment. Therefore, it should be understood the reference numerals in FIG. 4 and subsequent figures which are the same as reference numerals used in FIGS. 1 through 3 indicate the same components.

The mobile phone system 10 comprises a mobile unit 12, and a hands-free kit 50. As in the previous embodiment, the hands-free kit 50 includes a coupling unit 52, a cassette adapter 70, and microphone 90. The coupling unit 52 in the second embodiment is in the form of a cradle which is adapted to receive and hold the mobile unit 12. The cradle 52 is typically mounted in a fixed location in a vehicle and is connected by a power cord 58 to the vehicle's battery. The cradle 52 includes an electrical connector (not shown) which mates with the connector 28 on the mobile unit 12. The cradle 52 may also, if desired, be coupled to an external antenna (not shown).

In the embodiment shown in FIG. 4, the cassette adapter 70 and external microphone 90 are coupled to two separate jacks 62. It will be understood, however, that a single jack could also be used as shown in the first embodiment. The use of two separate jacks 62 is merely an alternative.

The embodiment shown in FIG. 4 is advantageous in that it provides a support for the mobile unit 12 in a fixed location within a vehicle where it can be readily accessed by an occupant of the vehicle. Its primary disadvantage is that the cradle 52 cannot be readily moved from one vehicle to another. Therefore, the embodiment shown in FIG. 4 would be most advantageous for people who do not expect to operate more than one vehicle. Of course, the mobile unit 12 can still be undocked from the cradle and used as a hand-held unit.

Figure 5:
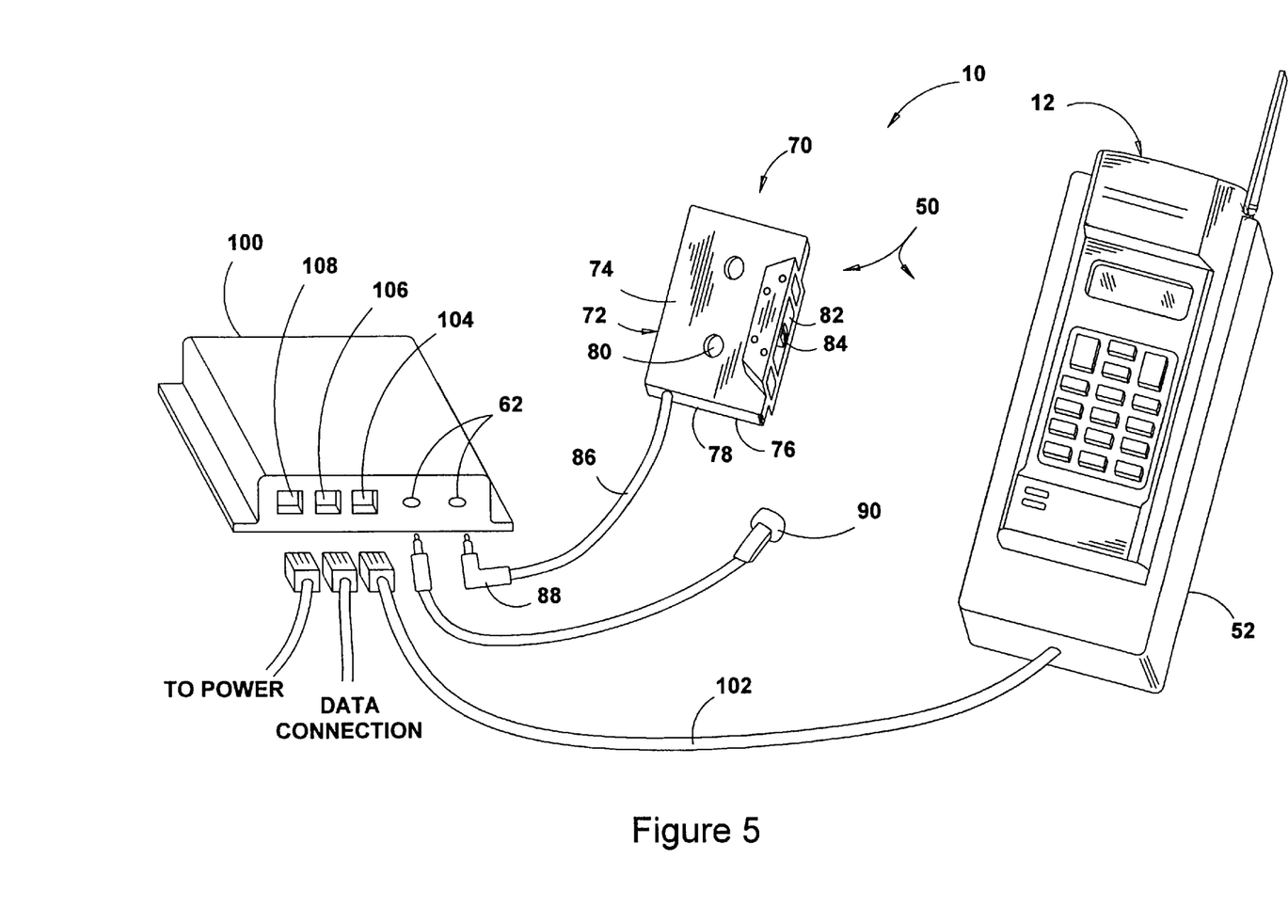
FIG. 5 is a perspective view showing a third embodiment of the hands-free kit of the present invention.
Figure 6:
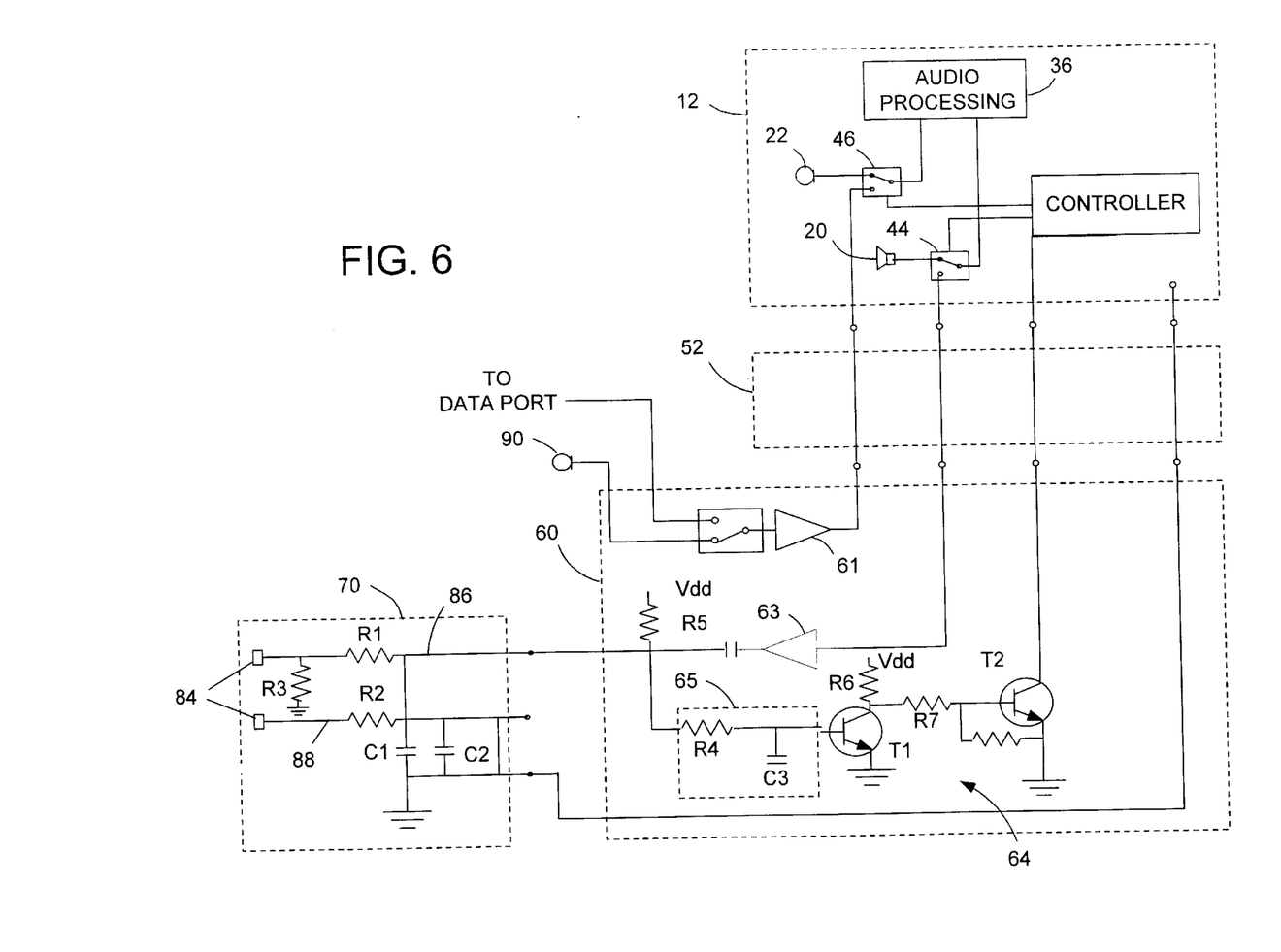
FIG. 6 is a schematic diagram of the coupling unit, mobile unit, and cassette adapter for the embodiment shown in FIG. 5.

Referring now to FIGS. 5 and 6, a third embodiment of the mobile phone system 10 of the present invention is shown. The mobile phone system 10 includes a mobile unit 12 and a hands-free kit 50. The hands-free kit 50 includes a coupling unit 52 in the form of a cradle, a cassette adapter 70, an external microphone 90, and a remote unit 100. As in the previous embodiment, the cradle 52 receives and holds the mobile unit 12. The cradle 52 includes an electrical connector (not shown) that mates with the connector 28 on the mobile unit 12. The cradle 52 is connected by a cable 102 to the remote unit 100.

The remote unit 100 is adapted to be mounted in a hidden location within a vehicle. For example, the remote unit 100 can be mounted beneath the seats of the vehicle. The remote unit 100 includes an input 104 to provide an electrical connection to the coupling unit 52, a data input 106 to provide a connection for a modem or laptop computer, and a power input 108 to connect a power cord. The remote unit 100 also includes a pair of jacks 62 for the cassette adapter 70 and microphone 90.

The coupling circuit 60 for the third embodiment is shown in FIG. 6. The coupling circuit 60 is substantially the same as before with the exception of a switch 66 in the input path to switch between the external microphone 90 and data input 106.

The embodiment shown in FIGS. 5 and 6 is useful in those circumstances where it is desirable to have the mobile unit 12 mounted in a fixed location within a vehicle. Unlike the previous embodiments, the embodiment shown in FIG. 5 includes a data input 106 on the remote unit 100 which allows the user to send and receive data, such as facsimile transmissions. It will be readily appreciated by those skilled in the art that a data input 106 could also be provided in the cradle 52 and thereby eliminate the remote unit 100.

Figure 7:
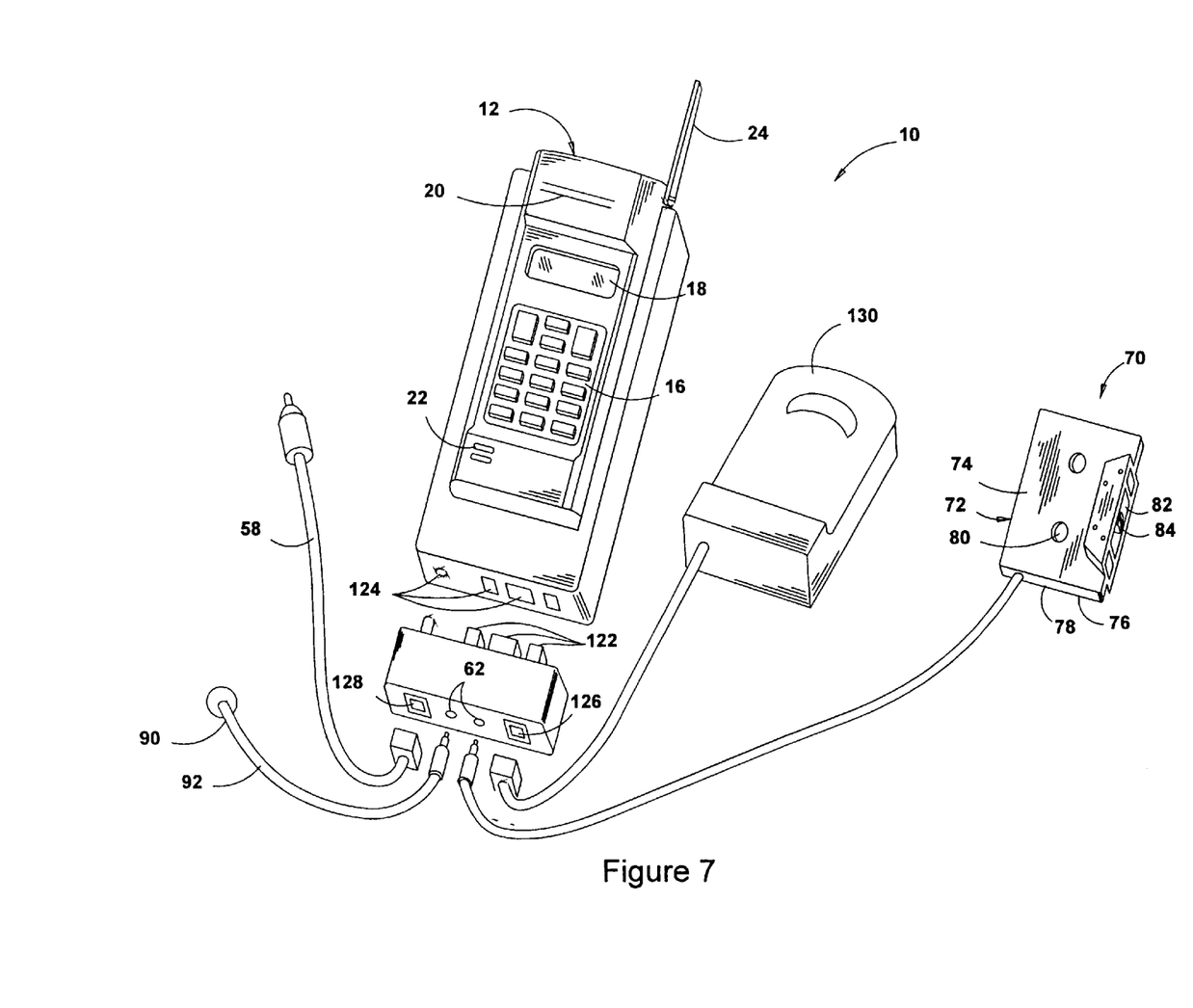
FIG. 7 is a perspective view showing a fourth embodiment of the hands-free kit of the present invention.
Figure 8:
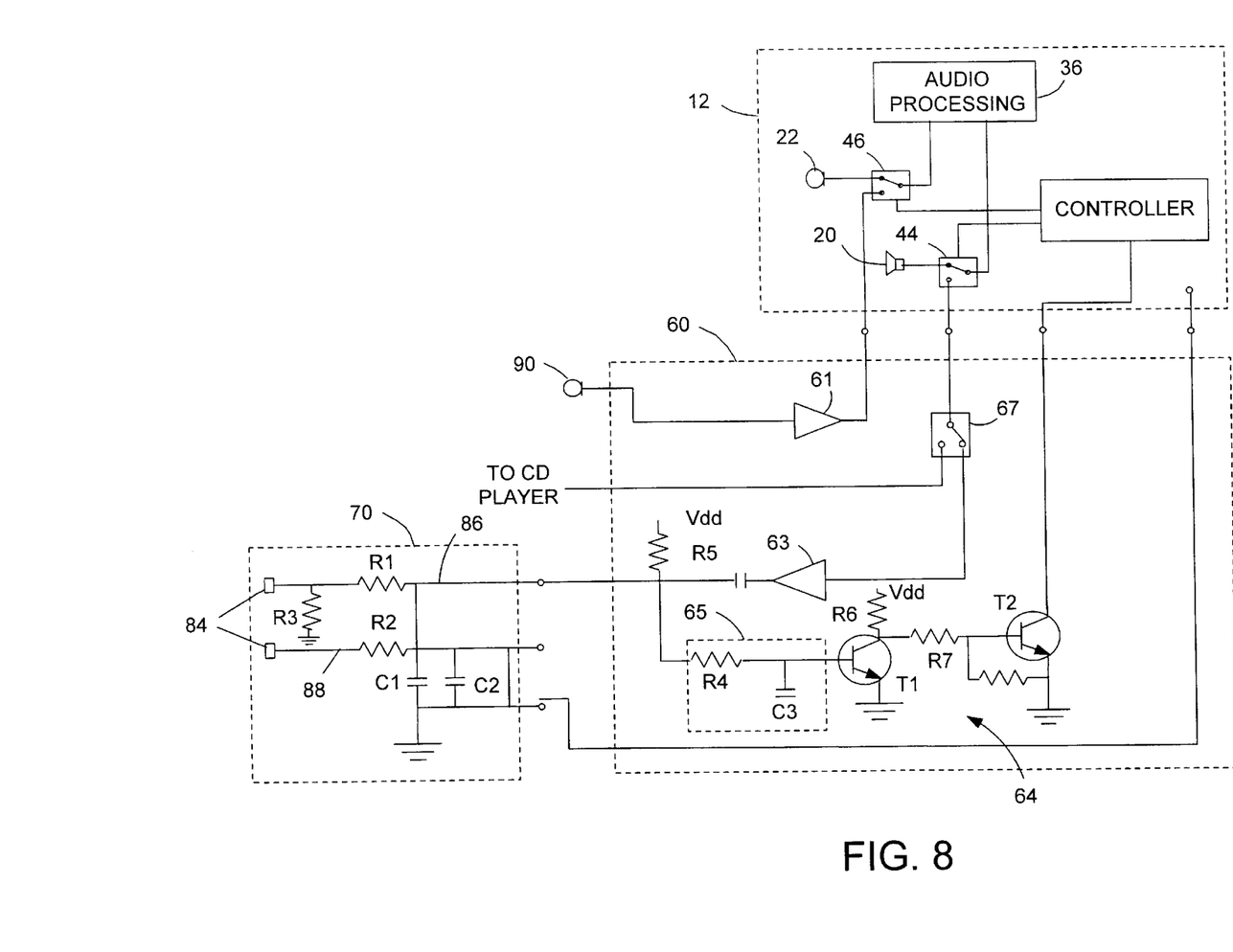
FIG. 8 is a schematic diagram of the coupling unit, mobile unit, and cassette adapter for the embodiment shown in FIG. 7.

FIGS. 7 and 8 show a fourth embodiment of the present invention. The embodiment shown in FIG. 6 includes a mobile unit 12 and a hands-free kit 50. The hands-free kit 50 includes a coupling unit 52, a cassette adapter 70, and an external microphone 90. The coupling unit 52 is in the form of a cradle having a detachable cradle adapter 120. As in the previous embodiments, the cradle includes an electrical connector (not shown) which mates with the connector 28 on the mobile unit. The cradle unit also includes electrical connectors 124 which mate with corresponding electrical connectors 122 on the cradle adapter 120 to electrically couple the cradle adapter 120 to the cradle 52. The cradle adapter 120 includes a pair of jacks 62 for the cassette adapter 70 and microphone 90. The cradle adapter 120 also includes an auxiliary input 126 and a power input 128. The power cord 58 plugs into the power input 128. An audio device, such as a CD player 130 may be plugged into the auxiliary input 126. The cradle adapter 120 would include a switching circuit 67 to select the audio signal which is output through jack 62 to the cassette adapter. When the phone is not in use, the signal from the auxiliary input 126 would be directed to the output. When the phone was in use, the switch would direct the audio signal from the mobile unit to the output. The switching circuit could also be used to cut off power to the CD player 130.

The coupling circuit 60 for the fourth embodiment is shown in FIG. 8. The coupling circuit 60 is substantially the same as before with the exception of a switch 67 in the output path to switch the audio output between the cassette adapter 70 and the mobile unit 12.

One advantage of the embodiment shown in FIG. 7 is that slightly different cradle adapters 120 could be used depending upon the user's needs. One cradle adapter 120 could be used for a CD player. A separate cradle adapter 120 could contain a data input to connect to a facsimile machine or modem. Further, the cradle could be designed so that the cassette adapter and microphone 90 could plug directly into the cradle 52 when the cradle adapter 120 is not being used. This would allow the cradle adapter 120 to be sold as a separate accessory to the hands-free kit 50.

From the foregoing, it is apparent that the hands-free kit 10 of the present invention provides a convenient method for outputting audio signals via a car stereo system. Since the car stereo system includes a separate amplifier and speakers, there is no need to include these components as part of the hands-free kit. This greatly simplifies the design of the hands-free kit and reduces the cost to the end user. Furthermore, the car stereo system typically includes a volume control which is readily accessible to the user. Moreover, the body control on the stereo system can be used to change the volume level during a telephone conversation.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What I claim is:

1. An accessory for a mobile radio telephone comprising:

a. a detachable coupling unit adapted to couple to said mobile radio telephone, said coupling unit including a coupling circuit having an audio input and an audio output for electrically coupling to audio circuits contained in said mobile radio telephone;

b. a detachable cassette adapter for coupling to said audio output on said coupling unit and for transferring audio signals originating with said mobile radio telephone to a playback head in a cassette player, said cassette adapter including a connector for mating with said audio output on said coupling unit and a record head for contacting said playback head in said cassette player to apply said audio signals to said playback head in said cassette player;

c. an external microphone for detachably connecting to said audio input in said coupling unit.

2. The accessory of claim 1 wherein said coupling unit comprise a cradle adapted to receive and hold said mobile radio telephone.

3. The accessory of claim 2 wherein said coupling unit includes a cradle adapter which couples to said cradle, wherein said cradle and cradle adapter collectively include the coupling circuit.

4. The accessory of claim 1 wherein said coupling unit includes an auxiliary input for an audio device such as a CD player and wherein said auxiliary input is connected to said audio output of said coupling unit.

5. The accessory of claim 4 wherein said coupling unit includes a switching circuit to selectively direct the output of said mobile radio telephone and said audio device to said cassette adapter.

6. The accessory of claim 1 wherein said coupling unit includes a data port which is electrically connected to said mobile radio telephone for inputting data which is transmitted by said mobile radio telephone.

7. The accessory according to claim 1 further including a detection circuit in said coupling unit for detecting the presence of said cassette adapter when the cassette adapter is connected to said coupling unit, and generating an enabling signal that is used by said mobile radio telephone to redirect the phone's audio input and output to said coupling unit.

8. A mobile radio telephone system comprising:

a. a hand-held unit including a receiver and a transmitter and receiving voice and/or data signals via radio;

b. a detachable coupling unit adapted to couple to said mobile radio telephone, said coupling unit including a coupling circuit having an audio input and an audio output for electrically coupling to audio circuits contained in said mobile radio telephone;

c. a detachable cassette adapter for coupling to said audio output on said coupling unit and for transferring audio signals originating with said mobile radio telephone to a playback head in a cassette player, said cassette adapter including a connector for mating with said audio output on said coupling unit and a record head for contacting said playback head in said cassette player to apply said audio signals to said playback head in said cassette player; and d. an external microphone for detachably connecting to said audio input in said coupling unit.

9. The accessory according to claim 8 further including a detection circuit in said coupling unit for detecting the presence of said cassette adapter when the cassette adapter is connected to said coupling unit, and generating an enabling signal that is used by said mobile radio telephone to redirect the phone's audio input and output to said coupling unit.

10. The mobile radio telephone of claim 8 wherein said coupling unit includes a cradle adapted to receive and hold said mobile radio telephone.

11. The mobile radio telephone of claim 10 wherein said coupling unit includes a cradle adapter which couples to said cradle, wherein said cradle and cradle adapter collectively include the coupling circuit.

12. The mobile radio telephone of claim 8 wherein said coupling unit includes an auxiliary input for an audio device such as a CD player and wherein said auxiliary input is connected to said audio output of said coupling unit.

13. The mobile radio telephone of claim 12 wherein said coupling unit includes a switching circuit to selectively direct the output of said mobile radio telephone and said audio device to said cassette adapter.

14. The mobile radio telephone of claim 8 wherein said coupling unit includes a data port which is electrically connected to said mobile radio telephone for inputting data which is transmitted by said mobile radio telephone.

\* \* \* \* \*